United States Patent Office 2,878,676
Patented Mar. 24, 1959

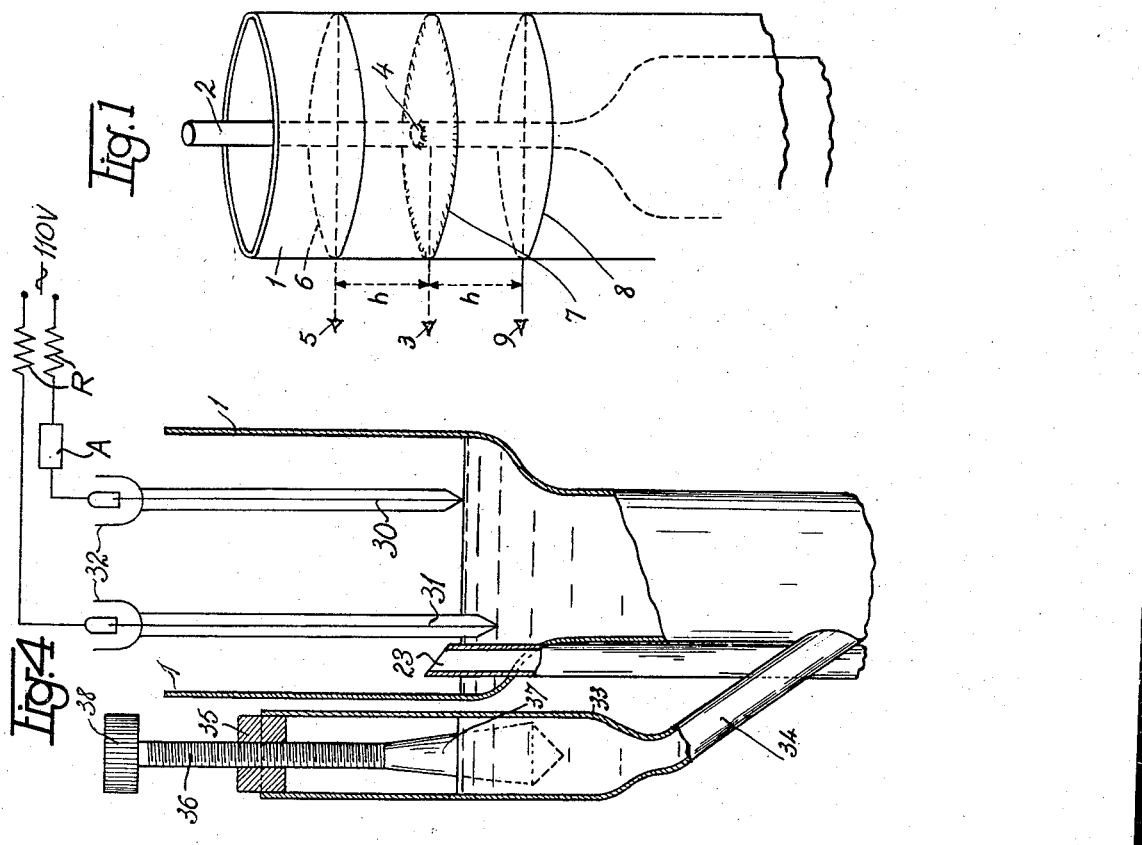

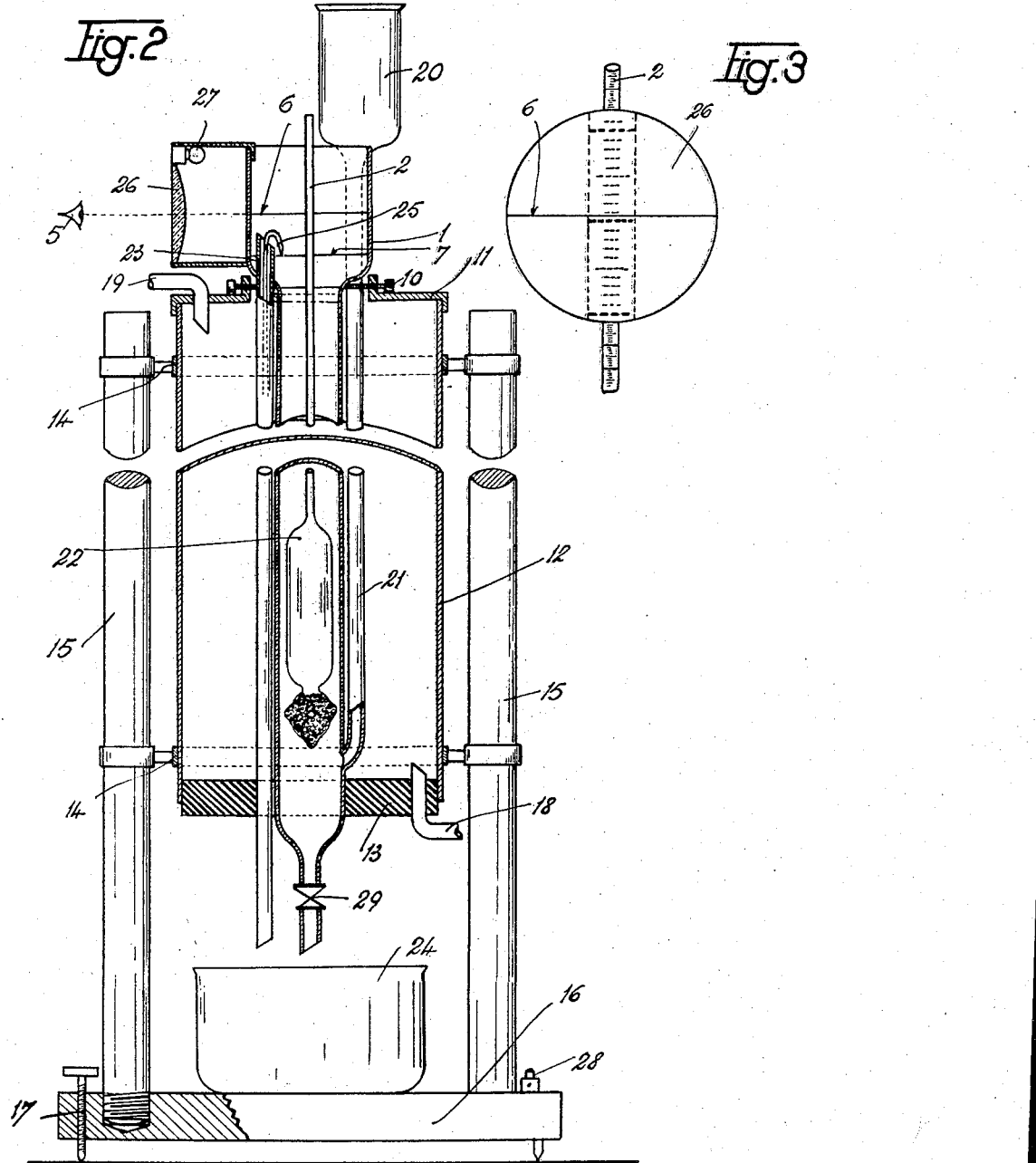

2,878,676

APPARATUSES FOR MEASURING THE DENSITY OF LIQUIDS

Raymond Pochan, Chardonnay par Uchizy, and Andre Pochan, Montesson, France

Application March 14, 1952, Serial No. 276,504

Claims priority, application France March 17, 1951

3 Claims. (Cl. 73—444)

This invention relates to apparatuses for measuring the density of liquids embodying Archimedes' principle, such as areometers and areoscopes.

Though such apparatuses were conceived long ago, no notable improvement has ever been hitherto made in their structure or their utilization. The shape of areometers has not practically changed and the indications provided are still read either over or under the meniscus according to the transparency or the opacity of the liquid to measure. The scales only have changed according to the uses for which the apparatuses are meant.

At first sight, areoscopes, such as they are known, appear to be extremely sensitive, but a thorough study of the question shows that the accuracy obtained is delusive as these apparatuses can only provide exactly the second decimal figure of the density, which is obviously insufficient.

The reasons for such an inaccuracy are many:

(a) The main reason being the existence of a meniscus about the stem of the areometer, the shape of which varies according to the surface tension of the liquid and the cleanliness of the stem. The uncertain position of the eye of the operator entails important phenomena of refraction which vary not only according to the refraction index of the liquid studied, but also and particularly according to the shape of the hyperbolic contact curve. Moreover, the areometers now in use make it impossible to effect an accurate reading with a colored or turbid liquid. In such a case, the operator must effect the reading over the meniscus and thereafter make a correction which is rather unreliable.

(b) A further reason for errors is the imperfection of the scales used as it is sufficient to examine carefully with a magnifying glass to realize that their precision is delusive.

(c) A third reason for important errors is the continuous variations of the temperature of the liquid studied. Now, in a conventional areometer the stem of which has a 3 mm. diameter, any variation of temperature of $\frac{1}{10}$ of degree centigrade corresponds to a variation of about 1 mm. on the scale, which has the result of a difference of several units of the fourth decimal figure of the density. And, in careful determinations of densities, the variation of the temperature during the tests generally reaches from 4 to 5 tenths of a degree centigrade. Therefore, the third decimal figure obtained is wrong.

(d) Most of the present apparatuses, which are lead ballasted, cannot float vertically as the cotton stuffing is not sufficient to immobilize efficiently the lead grains and this has the effect of displacing their center of gravity, which causes the apparatuses to float in a more or less oblique position.

(e) A further drawback of the areometers now in use lies in their unpleasant and persisting tendency to rotate which not only considerably delays the reading but also often renders the operator too nervous.

This invention has for its object to remedy these drawbacks and to make it possible to obtain quickly and very accurately the density of any liquid whatever be its nature, its viscosity and its opacity.

To this end, the invention has for its first object a method of reading the scale of an areometer doing away with the usual inaccuracy due to the miniscus, consisting essentially in effecting said reading at a constant distance from the general level of the liquid the density of which is to be measured.

According to the case in point, the reading may be effected either over the general level of the liquid or under same.

The invention has also for its object various types of areoscopes specially conceived for carrying out said method which, as a rule, are characterized by the fact that they comprise, in combination with a test tube of a transparent material fit for containing the liquid and receiving the areometer, means for bringing the level of the liquid to a distance from a reference plane absolutely constant, fixed and precise, in which is effected the reading of the areometer.

A first embodiment, more particularly applicable to low viscosity liquids and which ensures automatically the desired constant level, comprises essentially, a semi-capillary siphon without any inertia of which the limb engaging the test-tube is so bevelled as to make an angle calculated that the drop of liquid raised through capillarity may be immaterial with respect to the cross-section of the test-tube.

An overflow tube, having a suitable cross-section, and whose upper orifice is slightly over the bevelled extremity of the siphon, will be advantageously adjoined to the latter to urge the bringing of the liquid to the desired level.

Under such conditions, the siphoning of the superficial layer of the liquid will be quickly effected through the overflow pipe and completed by means of the siphon proper, insuring a non-contaminated surface of the liquid and therefore a constant surface tension during the period of time required by the readings.

A second embodiment applicable to ionized liquids, even in a very low proportion such as bi-distilled water, comprises, inside the test-tube, two electrodes of a metal resistant to attack by the liquid, of a density to be determined, connected to an electrical circuit, the closing of which controls an appropriate visible or audible signal, one of said electrodes being adapted to being immersed more or less deeply into the liquid, while the tapering extremity of the other is included in a horizontal plane corresponding to the level to be obtained. Means, such as a movable mass capable of being immersed into the liquid, is provided to make it possible to gradually raise the level of the liquid in the test-tube to bring it into contact with the extremity of said electrode.

It is readily apparent that upon contact of the liquid with the second electrode, index-electrode, the visible or audible signal will instantaneously operate thereby ensuring a strict checking of the level. This arrangement allows an extremely accurate determination of the density of ionized liquids provided that the corrections due to the surface tension, the air-pressure and the hygrometric state of the ambient air be made in the results obtained.

In all the embodiments also, in order to increase the accuracy of the readings, there is provided according to the invention, a millimeter scale on the areometer, and a device for visible indications without a parallax, comprising, as a rule, a lens electrically lighted whose optic axis is included in the horizontal plane determined by a circular line engraved on the surface of the test-tube at a given distance from the constant level of the liquid, which constitutes the reference-plane of the apparatus.

According to a further characteristic feature of the invention, a constant temperature of the liquid will be advantageously obtained by means of a thermostatic jacket provided about the test-tube, filled with a liquid at a determined temperature.

The invention is also directed at improvements in areometers, properly so-called, aiming, on the one hand, at ensuring fixity of the center of gravity of the latter and, on the other hand, at preventing them from rotating. According to the invention, the first purpose is met through agglomeration of the lead grains which usually form the ballast of the areometers, said agglomeration ensuring an absolute and permanent vertical position of the floating areometer. The second purpose is met by giving an angulated shape to the hull containing the ballast of the areometer.

The following complementary description with reference to the appended drawings given by way of non-limitative examples is intended to show how the invention can be carried out, the characteristics appearing from the description and the drawings as well being, of course, part of the invention. In the drawings Fig. 1 is a diagrammatical view illustrating the application of a method of reading an areoscope.

Fig. 2 is a general elevational view, with a partial, vertical, axial section of an embodiment of an improved areoscope according to the invention in which a constant level can be automatically obtained through siphoning.

Fig. 3 is a diagrammatical view showing part of the scale of the areometer and enlargement thereof by the visible indication device.

Fig. 4 is a partial sectional view of the upper part of the test-tube of the areoscope comprising a device for bringing the liquid to the desired level by means of electrodes for ionized liquids.

In the diagrammatical illustration of Fig. 1, 1 is the upper part of the test-tube containing the liquid the density of which is to be determined and 2 is the upper stem of the areometer bearing the graduated scale, not shown.

According to the usual method of reading of the scale of the areometer, the eye of the operator shown at 3 is looking at the upper or lower part of the meniscus 4 which offers the drawbacks hereinabove referred to.

According to the present method the eye 5 of the operator placed in the reference plane 6 formed by a circular line drawn with a diamond on the surface of the test-tube 1 looks at and reads the graduation of the scale at a constant distance $h$ over the general level 7 of the liquid.

In some cases, the reading may be effected in a reference plane 8, being at a distance $h$ under the general level 7 of the liquid in which the eye 9 of the operator is placed.

The device shown as an example in Fig. 2 relates to an areoscope with a system for automatically bringing the liquid to the desired level, more particularly adapted to determine the density of low viscosity liquids.

In this example, the test tube 1 is centered by means of screws 10 in a flange cap forming at its upper part a glass or plastic material jacket 12 surrounding the test-tube 1 and associated to it, at its lower part, through a rubber joint 13. The jacket 12 which supports in this way the areoscope is supported, in turn, by two tubular columns 15, fixed on a base 16 by means of collars 14. Constancy of the temperature is ensured by a thermostat regulated liquid admitted in the jacket 12 through a pipe 18 and flowing out of it through a pipe 19.

The liquid, the density of which it is desired to determine, is poured into the test-tube 1 through a funnel 20 which communicates through a duct 21 with the lower part of the test-tube in which the areometer 22 is placed. The liquid fills the test-tube up to the top of an overflow pipe 23, the upper orifice of which is inside the test-tube, at a certain distance under the circular line 6 engraved on the surface of the test-tube, the excess of the liquid being evacuated at the bottom of the tube 23 into a beaker 24 placed on the base 16. The elimination of the excess of liquid is completed through a semi-capillary siphon 25 without any inertia, the bent limb of which, engaging the test-tube has a bevelled extremity placed under the upper orifice of the overflow pipe 23. Thus, the fixed and constant general level 7 is accurately obtained.

The reading is effected through a visible device without a parallax 26, lighted by an electric lamp 27, the optical axis of which is included in the reference plane formed by the circular line 6, the eye 5 of the operator being in the same plane. A switch 28 secured on the base 16 permits the lighting of the lamp 27 so that the reading can be effected by night.

Fig. 3 discloses the accuracy of the reading obtained with the apparatus which can be of the range of $\frac{1}{10}$ mm.

Fig. 4 illustrates diagrammatically the upper part of the test-tube of an electrode-areoscope designed for determining with a great accuracy the density of ionized liquids. As a whole, the apparatus is substantially identical to the one hereinabove described but no bevelled semi-capillary siphon is adjoined to the overflow pipe 23. Said tube still plays its part as evacuator of the superficial layer of the liquid and makes it possible to eliminate the foams that might float on the top as in the case of milk. In the upper part of the test-tube 1 are engaged, in the present embodiment, two electrodes 30 and 31 welded to thimbles 32 allowing to connect them to an electric circuit which may be controlled by a switch 28 provided on the base 16 of the apparatus, Fig. 2, with said circuit including a visible or audible signal A. The lower extremities of the electrodes 30 and 31 are at offset levels with respect to each other, the extremity of the higher electrode 30 being in a horizontal plane corresponding to the fixed and constant general level 7 to be obtained. It is the latter electrode 30 that constitutes the index-electrode.

To the test-tube 1 is juxtaposed an auxiliary capacity 33 which communicates with the interior of the test-tube through a pipe 34. Said capacity is closed at its upper part by a tapped plug 35 in which a threaded rod 36 is screwed carrying at its lower extremity a levelling mass 37 and at its upper extremity a milled control knob 38.

The filling of the test tube 1 is effected in the same manner as in the previous case. When the overflow pipe 23 has achieved its purpose, a small amount of the liquid is evacuated through the drain cock 29 and then the level of the liquid 7 is brought back into contact with the index-electrode by lowering the levelling mass 37 by screwing the threaded rod 36 by means of the milled knob 38. The electric contact then closes the electric circuit and operates the visible or audible signal A.

The reading is effected in the same manner as in the case of Fig. 2. The accuracy of the results is highly increased and this apparatus makes it possible to obtain the fifth decimal figure of the density, provided that the corrections due to the surface tension of the liquid studied, the air pressure of the moment and the hygrometric degree of the ambient air are made.

It is obvious that any modification can be made in the details of the various illustrated and described embodiments without departing from the limits of the invention.

As it appears from the foregoing, apparatuses improved according to the invention make it possible to determine accurately the density of all the liquids whatever their nature, their viscosity and their opacity provided that the operation is effected at a constant temperature, which requirement can be met by providing the areoscopes with a thermostatic jacket such as shown at 12, they make it possible to obtain the fourth decimal figure of the density. The electrode areoscopes of the type illustrated on Fig. 4 can provide the fifth decimal figure, provided that the necessary corrections, previously referred to are made.

The present apparatus is capable of considerable modification and such changes thereto as come within the scope of the appended claims are deemed to be parts thereof.

What we claim is:

1. Areoscope, more particularly designed for measuring the density of ionized liquids, comprising a transparent material test-tube adapted to contain the liquid to be tested and to receive the measuring areometer, an electrode of a metal unattacked by said liquid, and positioned inside said test tube and extending into said liquid, a second electrode also of a metal unattacked by said liquid positioned within said test tube, one extremity of the latter electrode being tapered and included in the horizontal plane corresponding to the level to be obtained, an electrical circuit to which said two electrodes are connected, a signal controlled by the closing of said electrical circuit, means for slowly and continuously raising the level of said liquid, in said test-tube, to bring it into contact with the tapering extremity of said second electrode and means for taking the reading of the areometer in a plane of reference located at an accurately fixed distance from said horizontal plane upon said signal being operated by said fluid.

2. Areoscope, more particularly designed for measuring the density of ionized liquids, comprising a transparent material test-tube adapted to contain the liquid to be tested and to receive the measuring areometer, an electrode of a metal unattached by said liquid and positioned inside said test tube and extending into said liquid, a second electrode also of a metal unattacked by said liquid and positioned within said test tube with one extremity of the latter electrode being tapered and included in the horizontal plane corresponding to the level to be obtained, an electrical circuit to which said two electrodes are connected, a signal controlled by the closing of said electrical circuit, a movable mass capable of being plunged into said liquid for causing the level of said liquid to be gradually raised for being brought into contact with the tapering extremity of said second electrode closing said circuit operating said signal and means for taking the reading of said areometer in a reference plane located at an accurately fixed distance of said horizontal plane when said liquid has been raised to said plane.

3. An areoscope comprising a vertically positioned transparent test tube for containing the liquid to be tested, a pair of electrodes extending into the upper portion of said test tube with one electrode extending longitudinally of said tube a predetermined greater distance than the other of said electrodes, indicating means electrically connected to said electrodes for receiving current when liquid within said test tube contacts both electrodes at one time, reference indicia provided on said test tube providing a reference for reading an areometer, an areometer positioner longitudinally of said test tube, a second tube connected at one end to said test tube and in communication therewith, means closing the other end of said second mentioned tube, a body positioned in said second tube, means for gradually and continuously moving said body in said second tube whereby liquid in said tubes is caused to gradually be raised or lowered thereby and means for taking the reading of said aerometer in the plane determined by said reference indicia when said indicating means is operated upon said fluid contacting both the electrodes.

References Cited in the file of this patent

UNITED STATES PATENTS

| | | |
|---|---|---|
| 480,480 | Tiffany | Aug. 9, 1892 |
| 721,744 | Richter | Mar. 3, 1903 |
| 907,107 | Courtois | Dec. 15, 1908 |
| 1,367,879 | Laird | Feb. 8, 1921 |
| 1,607,912 | Peper | Nov. 23, 1926 |
| 1,664,265 | Rieber | Mar. 27, 1928 |
| 1,881,572 | Herz | Oct. 11, 1932 |
| 1,891,800 | Collins | Dec. 20, 1932 |
| 1,965,837 | Herdeg | July 10, 1934 |
| 2,017,095 | Hiergesell | Oct. 15, 1935 |
| 2,023,196 | Fairchild | Dec. 3, 1935 |
| 2,127,065 | McClure | Aug. 16, 1938 |
| 2,212,809 | Ericson | Aug. 27, 1940 |
| 2,543,522 | Cohen | Feb. 27, 1951 |

FOREIGN PATENTS

| | | |
|---|---|---|
| 187,484 | Great Britain | Oct. 26, 1922 |
| 226,311 | Great Britain | Dec. 24, 1924 |
| 602,646 | Great Britain | May 31, 1948 |